United States Patent [19]

Freiter

[11] 4,020,034

[45] Apr. 26, 1977

[54] EPOXY RESIN COATING COMPOSITION

[75] Inventor: Edward R. Freiter, Midland, Mich.

[73] Assignee: The Dow Chemical Company, Midland, Mich.

[22] Filed: Aug. 11, 1975

[21] Appl. No.: 603,894

[52] U.S. Cl. .................. 260/32.8 EP; 260/2 EP; 260/2 BP; 260/31.2 N; 260/32.8 N; 260/33.2 EP; 260/33.6 EP; 260/33.6 UB; 260/78.41

[51] Int. Cl.$^2$ .................. C08K 5/01; C08K 5/02; C08K 5/06; C08K 5/07

[58] Field of Search ........ 260/32.8 EP, 2 EP, 2 BP, 260/31.2 N, 33.2 EP, 78.41, 33.6 EP, 32.8 N, 33.8

[56] References Cited

UNITED STATES PATENTS

| 2,895,947 | 7/1959 | Shokal et al. | 260/78.41 |
| 3,297,781 | 1/1967 | McGrary et al. | 260/32.8 EP |
| 3,444,111 | 5/1969 | Hickner | 260/78.41 |
| 3,627,720 | 12/1971 | Hinton et al. | 260/78.41 |

FOREIGN PATENTS OR APPLICATIONS 862,888  1/1953  Germany

*Primary Examiner*—Allan Lieberman
*Attorney, Agent, or Firm*—James G. Carter

[57] ABSTRACT

Coatings having good weatherability characteristics are obtained by curing an epoxy resin which is an adduct of glycidol and an aliphatic or cycloaliphatic diisocyanate such as hexamethylene diisocyanate with an aliphatic or cycloaliphatic acid or anhydride such as tetrahydrophthalic anhydride.

3 Claims, No Drawings

EPOXY RESIN COATING COMPOSITION

This invention pertains to epoxy resins and more particularly it pertains to epoxy resin coatings having good weatherability properties.

The epoxy resin coating compositions of the present invention comprise the following:

A. an epoxy resin which is the adduct of glycidol with an alipatic or cycloaliphatic diisocyanate in a molar ratio of 2 to 1 respectively, B. a curing quantity of an aliphatic or cycloaliphatic acid or anhydride; and C. a suitable organic solvent or mixture thereof.

The epoxy resins employed as component (A) in the present invention can be prepared by the procedure described in Chemical Abstracts Vol. 53, 3147a.

Suitable diisocynates which can be reacted with glycidol to prepare the epoxy resins employed herein include for example, tetramethylene diisocyanate, pentamethylene diisocyanate, hexamethylene diisocyanate, isophorone diisocyanate, hydrogenated toluene diisocyanate, hydrogenated methylene bisphenylene diisocyanate, mixtures thereof and the like.

Suitable solvents which can be employed in the coatings of the present invention include ketones such as for example, acetone, methyl ethyl ketone, methyl isobutyl ketone and the like, acetates such as, for example, ethyl acetate, butyl acetate, and the like, glycol ethers such as, for example, ethyl ether of ethylene glycol, ethyl ether of diethylene glycol, n-butyl ether of diethylene glycol, methyl ether of propylene glycol and the like, aromatic compounds such as, for example, toluene, benzene, xylene and the like, chlorinated solvents such as trichloromethane and the like, and mixtures of any of such suitable solvents.

The solvents are employed in quantities which provide for suitable application viscosities of the epoxy resin coatings. This can be readily determined by one skilled in the coating art to which this application is directed.

Suitable aliphatic or cycloaliphatic acids or anhydrides which can be employed herein include, for example, tetrahydrophthalic acid, tetrahydrophthalic anhydride, hexahydrophthalic acid, hexahydrophthalic anhydride, endo-cisbicyclo [2.2.1]-5-heptene-2,3-dicarboxylic anhydride, methylbicyclo[2.2.1]-heptene-2,3-dicarboxylic anhydride, mixtures thereof and the like.

The acids or anhydrides are generally employed in quantities of from about 0.8 to about 1.2 equivalents per epoxy equivalent and preferably in stoichiometric quantities with the epoxy resin.

Other components can be employed in the coating compositions of the present invention including, for example, colorants, fire retardant agents, flow control agents, and the like.

The following examples are illustrative of the present invention and are not intended to limit the scope thereof in any manner.

EXAMPLE 1

A. PREPARATION OF EPOXY RESIN

A solution containing 150 gm (0.893 m) of hexamethylene diisocyanate 158 gm (2.027 m) of glycidol and 1500 ml of chloroform was heated to reflux with stirring and 1 ml of stannous octoate dissolved in 10 ml of methylene chloride was added in one portion. An exothermic reaction ensued. After refluxing for 1-¼ hours, chloroform was removed on a rotary evaporator and the resulting precipitate was crystallized from carbon tetrachloride. An oil formed at the top of the carbon tetrachloride during this crystallization and was taken off. This oil, on cooling, solidified and was partly dissolved and crystallized from toluene. An oil layer which remained in the toluene (~35 gm) showed several carbamyl peaks in the I.R. Spectrum and was discarded. The crystallized materials from the toluene and the carbon tetrachloride layers were put together to yield 112 g (0.443 m) 76% ) of desired product having a melting point of 91°–92°.

B. PREPARATION OF COATING

A coating was prepared employing the following composition:

20 parts by weight of the epoxy prepared in A above 10 parts by weight of tetrahydrophthalic anhydride (T.H.P.A.)

20 parts by weight of trichloromethane 15 parts by weight of titanium dioxide 2 drops per gram of resin A of BYK 300, a flow-control agent.

The above coating formulation is designated as formulation 1-B-1.

Another coating formulation was prepared from the same components as 1-B-1 except that the titanium dioxide was omitted. This coating is designated as 1-B-2.

The above formulations were prepared by dissolving the diepoxide in chloroform and the T.H.P.A. and BYK 300 in acetone. These two solutions were filtered, mixed together with stirring. In the case of pigmented coatings titanium dioxide was added to the filtered acetone solution containing T.H.P.A. and the resulting suspension was ball milled overnight. The filtered chloroform solution was added and ball milling was resumed an additional 30 minutes.

The formulations were applied onto Bonderite steel panels or aluminum panels with a 28 round wire bar. After air drying approximately 15 minutes they were cured in an oven at 180° C.

The coated panels were subjected to several tests, the results of which are given in the following Table I.

TABLE I

| FORMULATION NUMBER | COATING THICKNESS | WATER RESISTANCE[1] | SOLVENT RESISTANCE[2] NO. OF RUBS | REVERSE IMPACT in.-lbs. | CROSS HATCH ADHESION[3] | PENCIL HARDNESS | SALT SPRAY RESISTANCE[4] | CONICAL MANDREL BEND |
|---|---|---|---|---|---|---|---|---|
| 1-B-1 (pigmented) | ≈1 mil | pass | >100 | >160 | 100% | 6–9 | not tested | failed ⅛" |
| 1-B-2 | ≈1 mil | pass | >100 | >160 | 100% | 3–6 | passed 245 | passed ⅛" |

TABLE I-continued

| FORMULATION NUMBER | COATING THICK- NESS | WATER RESIST- ANCE[1] | SOLVENT RESISTANCE[2] NO. OF RUBS | REVERSE IMPACT in.-lbs. | CROSS HATCH ADHESION[3] | PENCIL HARD- NESS | SALT SPRAY RESISTANCE[4] hr. exposure | CONICAL MANDREL BEND |
|---|---|---|---|---|---|---|---|---|
| (non-pigmented) | | | | | | | | |

[1]The sample was immersed in boiling water for ½-hour. If there was no change in reverse impact, the sample was considered to have passed.
[2]The solvent resistance was determined by wrapping cheesecloth around the rounded end of a two pound ballpine hammer, soaking the cheesecloth in methyl ethyl ketone, putting the wet cheesecloth surface on top of the coated panel to be tested and pulling the ballpine hammer back and forth over the same surface while holding onto the back of the handle of the hammer. One rub was defined as one pull in one direction.
[3]The cross hatch adhesion tests were performed by crosshatching a one-inch square surface into 16 equal partsie, $16^2$ (256) squares and putting tape (Scotch No. 600) over the area. The number of squares that remained after the tape was removed was expressed as a percentage of the total (256) orginally present.
[4]The resistance of coatings to salt spray was measured by placing panels in a salt Fog Box containing a 5% salt solution at a temperature of 95° F (ASTM B117 Salt Fog Test).

The coated panels were also subjected to weatherability tests by placing them in a Gardner multi-angle glossometer model No. GG 9095, Ser. No. 62-77. The tests were conducted at an angle of 69° in an atmosphere of xenon. The results are given in the following Table II.

| FORMULATION NUMBER | PERCENT REFLECTANCE (REFLECTED GLOSS) AFTER THE INDICATED NUMBERS OF HOURS OF EXPOSURE | | | | | | |
|---|---|---|---|---|---|---|---|
| | 0 | 100 | 200 | 300 | 400 | 500 | 600 |
| 1-B-1 (pigmented) | 38 | 35 | 37 | 32 | 31 | 4 | 4 |
| 1-B-2 (non-pigmented) | 96 | 96 | 96 | 96 | 96 | 96 | 96 |

I claim:

1. An epoxy resin coating composition which comprises
   A. an epoxy resin which is the adduct of glycidol with an aliphatic or cycloaliphatic diisocyanate in a molar ratio of 2:1 respectively;
   B. a curing quantity of an aliphatic or cycloaliphatic acid or anhydride thereof; and
   c. a suitable organic solvent or mixture thereof in a quantity such as to provide the coating composition with a suitable application viscosity.

2. The composition of claim 1 wherein the diisocyanate of Component (A) is an aliphatic diisocyanate, Component (B) is a cycloaliphatic anhydride and Component (C) is a ketone.

3. The composition of claim 2 wherein the diisocyanate of Component (A) is hexamethylene diisocyanate, Component (B) is tetrahydrophthalic anhydride and Component (C) is acetone.

* * * * *